(12) United States Patent
Van Olst (10) Patent No.: US 11,981,369 B2
(45) Date of Patent: May 14, 2024

(54) CHASSIS STRUCTURE FOR AN ELECTRIC POWER WHEELCHAIR

(71) Applicant: KARMA MEDICAL PRODUCTS CO., LTD., Minsyong Township, Chiayi County (TW)

(72) Inventor: Eric Van Olst, Denekamp (NL)

(73) Assignee: KARMA MEDICAL PRODUCTS CO., LTD., Chiayi County (TW)

( * ) Notice: Subject to any disclaimer, the term of this patent is extended or adjusted under 35 U.S.C. 154(b) by 66 days.

(21) Appl. No.: 17/944,683

(22) Filed: Sep. 14, 2022

(65) Prior Publication Data

US 2023/0083107 A1    Mar. 16, 2023

(30) Foreign Application Priority Data

Sep. 15, 2021    (TW) ................................ 110134436

(51) Int. Cl.
| | | |
|---|---|---|
| *B62D 21/09* | (2006.01) | |
| *A61G 5/02* | (2006.01) | |
| *A61G 5/04* | (2013.01) | |
| *B62D 25/20* | (2006.01) | |
| *B60K 1/04* | (2019.01) | |

(52) U.S. Cl.
CPC ............... *B62D 21/09* (2013.01); *A61G 5/02* (2013.01); *A61G 5/047* (2013.01); *B62D 25/2009* (2013.01); *B60K 2001/0438* (2013.01)

(58) Field of Classification Search
CPC . A61G 5/02; A61G 5/047; A61G 5/04; B62D 21/09; B62D 25/2009; B60K 2001/0438; B60K 2001/0477; B60K 2001/0483; B60L 53/80; B65D 21/02

See application file for complete search history.

(56) References Cited

U.S. PATENT DOCUMENTS

| | | | | |
|---|---|---|---|---|
| 5,301,765 | A * | 4/1994 | Swanson .................. | B60K 1/04 |
| | | | | 180/68.5 |
| 7,828,310 | B2 * | 11/2010 | Vreeswijk ............... | A61G 5/043 |
| | | | | 280/755 |
| 8,413,752 | B2 * | 4/2013 | Page .................. | B62D 25/2054 |
| | | | | 180/68.5 |

(Continued)

FOREIGN PATENT DOCUMENTS

| | | | | | |
|---|---|---|---|---|---|
| CN | 112758184 | A * | 5/2021 | ............. | B62D 21/09 |
| DE | 102014204787 | A1 * | 9/2015 | ............. | A61G 5/045 |

(Continued)

*Primary Examiner* — Steve Clemmons
(74) *Attorney, Agent, or Firm* — Muncy, Geissler, Olds & Lowe, P.C.

(57) ABSTRACT

A chassis structure for an electric power wheelchair adapted for a seat frame to be mounted and supported thereon includes a chassis housing which defines an accommodation space, and an upper cover which covers an upper opened end of the accommodation space. At least one modular raising strip assembly is removably sandwiched between the chassis housing and the upper cover and has a predetermined thickness such that a volume of the accommodation space is increased with the raising strip assembly. With the modular raising strip assembly, the volume of the accommodation space is adjustable according to the battery capacity of a battery pack of a drive unit which is mounted in the accommodation space to meet the user's requirement.

8 Claims, 7 Drawing Sheets

(56) References Cited

U.S. PATENT DOCUMENTS

| | | | | |
|---|---|---|---|---|
| 8,540,272 B1* | 9/2013 | Vitale | ............... | B62D 47/003 |
| | | | | 280/638 |
| 8,616,309 B2* | 12/2013 | Art | ............... | B60L 53/00 |
| | | | | 180/68.5 |
| 10,112,471 B2* | 10/2018 | Higuchi | ............... | B60L 53/80 |
| 10,466,699 B2* | 11/2019 | Hirata | ............... | B60L 50/53 |
| 10,470,333 B2* | 11/2019 | Chen | ............... | H05K 7/1489 |
| 10,870,341 B2* | 12/2020 | Hung | ............... | B60S 9/14 |
| 10,981,465 B2* | 4/2021 | Ishigaki | ............... | B60L 50/64 |
| 11,399,995 B2* | 8/2022 | Coulter | ............... | A61G 5/063 |
| 11,479,143 B2* | 10/2022 | Cha | ............... | B60K 17/356 |
| 11,540,958 B2* | 1/2023 | Moore | ............... | A61G 5/08 |
| 11,858,571 B2* | 1/2024 | Harmon | ............... | B62D 21/11 |
| 2001/0013437 A1* | 8/2001 | Husted | ............... | A61G 5/1089 |
| | | | | 180/68.5 |
| 2023/0242195 A1* | 8/2023 | Beals | ............... | B62D 25/08 |
| | | | | 180/65.1 |

FOREIGN PATENT DOCUMENTS

| | | | | |
|---|---|---|---|---|
| FR | 2676171 A1 * | 11/1992 | ......... | A47B 87/0207 |
| GB | 2591276 A  * | 7/2021 | ............ | B60L 53/80 |

* cited by examiner

CHASSIS STRUCTURE FOR AN ELECTRIC POWER WHEELCHAIR

CROSS-REFERENCE TO RELATED APPLICATION

This application claims priority of Taiwanese Patent Application No. 110134436, filed on Sep. 15, 2021.

FIELD

The disclosure relates to an electric power wheelchair, and more particularly to a chassis structure for an electric power wheelchair.

BACKGROUND

A conventional electric power wheelchair generally includes a seat frame, a chassis, a drive unit, an operator and a plurality of wheels. The chassis defines an accommodation space for receiving the drive unit. The operator is disposed on the seat frame and is electrically connected with the drive unit to be operable to actuate the drive unit for rotating the wheels. However, since there are a plurality of drive units with different battery capacities to provide different amounts of electric power, a plurality of chassis with different dimensions should be made to accommodate the corresponding drive units, which increases the manufacturing and storage costs.

SUMMARY

Therefore, an object of the disclosure is to provide a chassis structure that can alleviate at least one of the drawbacks of the prior art.

According to the disclosure, the chassis structure for an electric power wheelchair is adapted for a seat frame to be mounted and supported thereon, and includes a housing unit, a drive unit and a wheel unit. The housing unit includes a chassis housing which defines therein an accommodation space that has an upper opened end, and an upper cover which is coupled with the chassis housing to cover the upper opened end. The drive unit is disposed in the accommodation space. The wheel unit is rotatably disposed on the housing unit and is driven by the drive unit. At least one modular raising strip assembly is removably sandwiched between the chassis housing and the upper cover and which has a predetermined thickness such that volume of the accommodation space is increased with the raising strip assembly, by an amount that is predetermined and that corresponds to the predetermined thickness of the modular raising strip assembly.

With the modular raising strip assembly replaceably disposed between the chassis housing and the upper cover to increase the volume of the accommodation space, the volume of the accommodation space is adjustable according to the battery capacity of the battery pack of the drive unit to meet the user's requirements for the operating environment and range.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, an embodiment of a chassis structure for an electric power wheelchair according to the disclosure is adapted for a seat frame 5 to be mounted and supported thereon, and includes a housing unit 1, a drive unit 2 and a wheel unit 3.

The housing unit 1 includes a chassis housing 11, an upper cover 12 and a cover plate 14. The chassis housing 11 is of a box shape, and has a base 111 and two side walls 112 extending upwardly from the base 111 to cooperatively define an accommodation space 101 that has an upper opened end 103. The upper cover 12 is coupled with the chassis housing 11 to cover the upper opened end 103 for preventing water from getting into the accommodation space 101, and has an upper support side for the seat frame 5 to be mounted and supported thereon. The drive unit 2 is disposed in the accommodation space 101, and has a battery pack 21 and an electrically controlled drive portion 22. The wheel unit 3 includes two front wheels 31, two rear wheels 32 and two ground-engaging idler wheels 33 rotatably connected to the chassis housing 11.

A modular raising strip assembly 13 is removably sandwiched between the chassis housing 11 and the upper cover 12, and has a predetermined thickness. In this embodiment shown in FIG. 2, the modular raising strip assembly 13 is formed as a U-shaped piece which has two elongated strips 131 and a crosspiece 132 which is integrally formed with and interconnects ends of the two elongated strips 131. Specifically, each of the elongated strips 131 is sandwiched between an upper edge of the respective side wall 112 and the upper cover 12. The base 111, the side walls 112, the modular raising strip assembly 13 and the upper cover 12 cooperatively define two mounting access openings 102 in communication with the accommodation space 101. The cover plate 14 is coupled with the chassis housing 11 to cover one of the mounting access openings 102.

Figure 1:
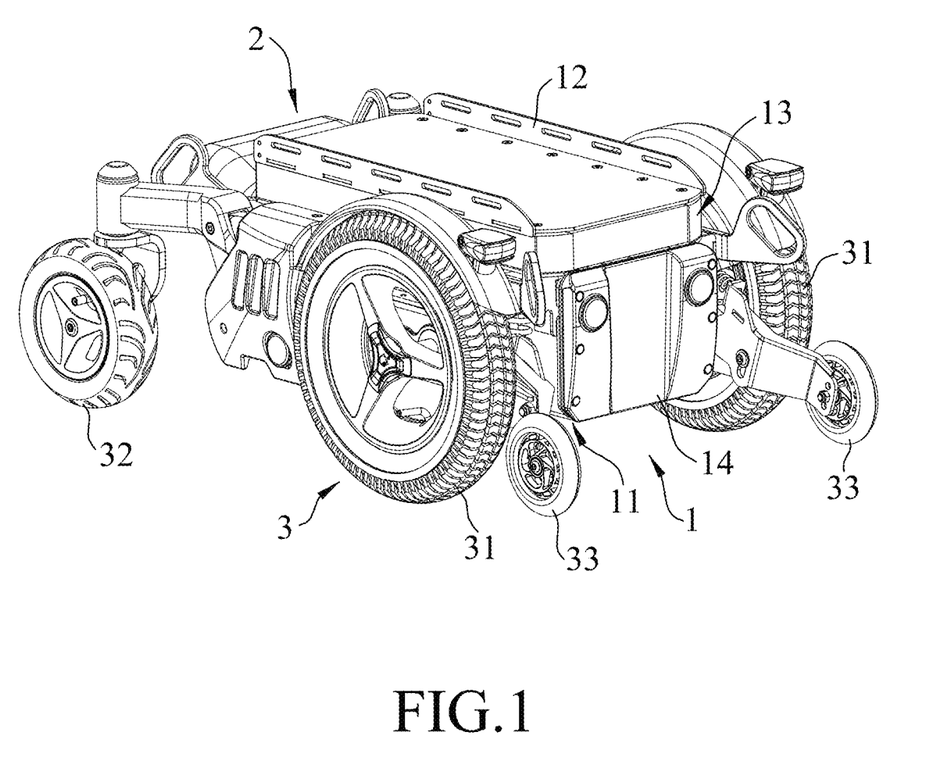
FIG. 1 is a perspective view illustrating an embodiment of a chassis structure according to the disclosure.
Figure 2:
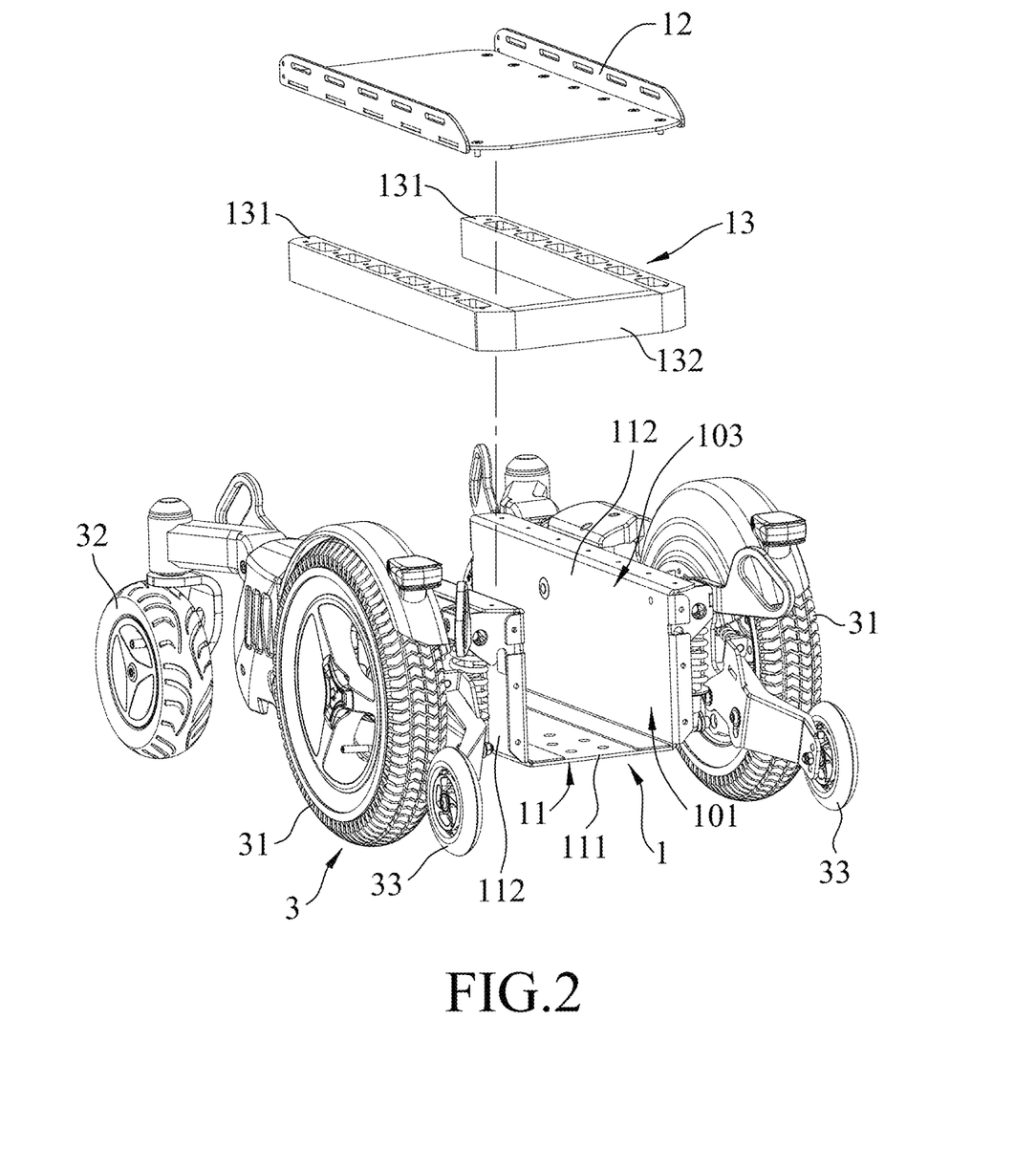
FIG. 2 is an exploded perspective view of the embodiment, a drive unit and a cover plate being removed for the sake of clarity.
Figure 3:
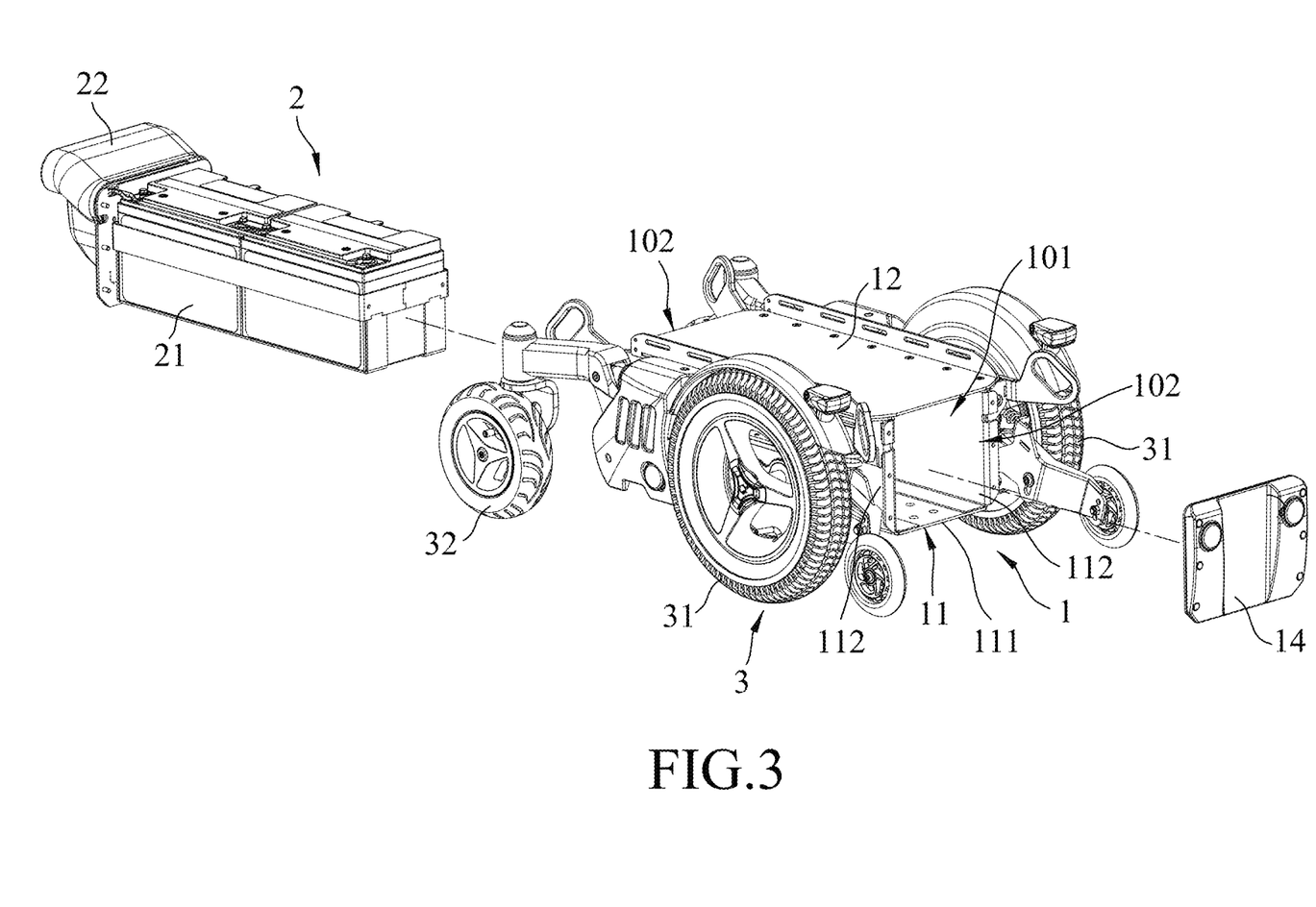
FIG. 3 is an exploded perspective view of the embodiment, illustrating when the drive unit is mounted through one mounting access opening.
Figure 4:
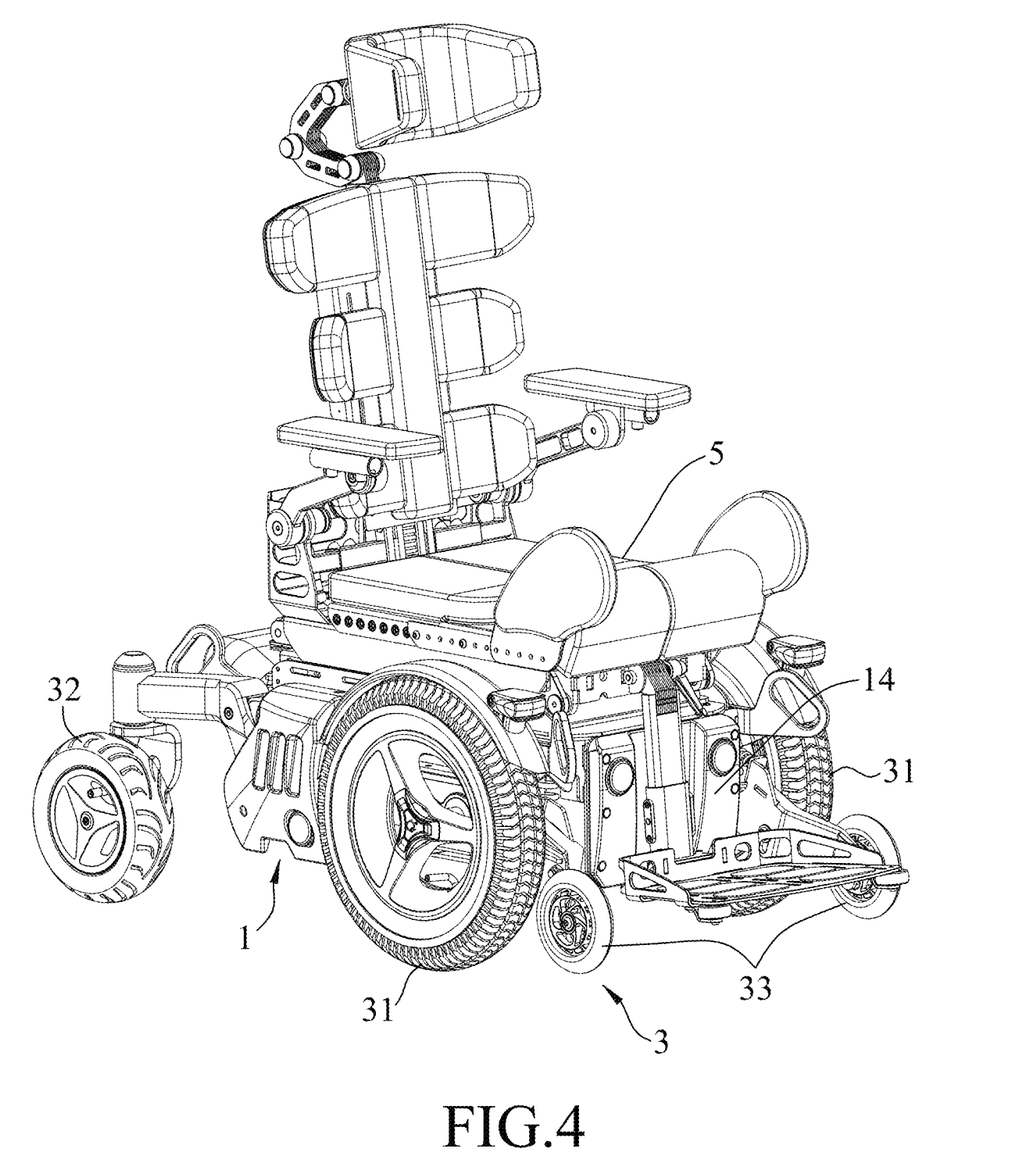
FIG. 4 is a perspective view illustrating the embodiment on which a seat frame is mounted.

In this embodiment, the drive unit 2 is mounted in the accommodation space 101 of the housing unit 1 through the mounting access opening 102 near the rear wheels 32 to have the electrically controlled drive portion 22 projecting rearwardly of the chassis housing 11. The drive unit 2 is disposed and configured to be front-wheel drive which drives rotation of the front wheels 31. The cover plate 14 is disposed to cover the mounting access opening 102 near the front wheels 31. The electrically controlled drive portion 22 is operable to control the power from the battery pack 21 and actuate the rotation of the wheel unit 3 in a known manner. The ground-engaging idler wheels 33 are mounted forwardly of the front wheels 31 to stabilize the movement of the electric power wheelchair.

Thus, in assembly, according to the user's requirements (e.g., the operating environment and range), a battery pack 21 with an appropriate battery capacity is provided which will have a size and thickness positively correlated to the battery capacity. The elongated strips 131 of the modular raising strip assembly 13 with the corresponding thickness, are sandwiched and fastened between the chassis housing 11 and the upper cover 12 such that a volume of the accommodation space 101 is increased with the raising strip assembly 13 by an amount that is predetermined and that corresponds to the predetermined thickness of the elongated strips 131 of the modular raising strip assembly 13 so that a battery pack 21 with a specific size may be received in the accommodation space 101 when the elongated strip 131 with the corresponding thickness is fastened. The elongated strips 131 are fastened to the side walls 112 by means of screws, and the upper cover 12 is then mounted on the elongated strips 131. The drive unit 2 is mounted in the accommodation space 101 through one mounting access opening 102. The cover plate 14 is then disposed to cover the other mounting access opening 102. Finally, the seat frame 5 is mounted on the upper cover 12.

Figure 5:
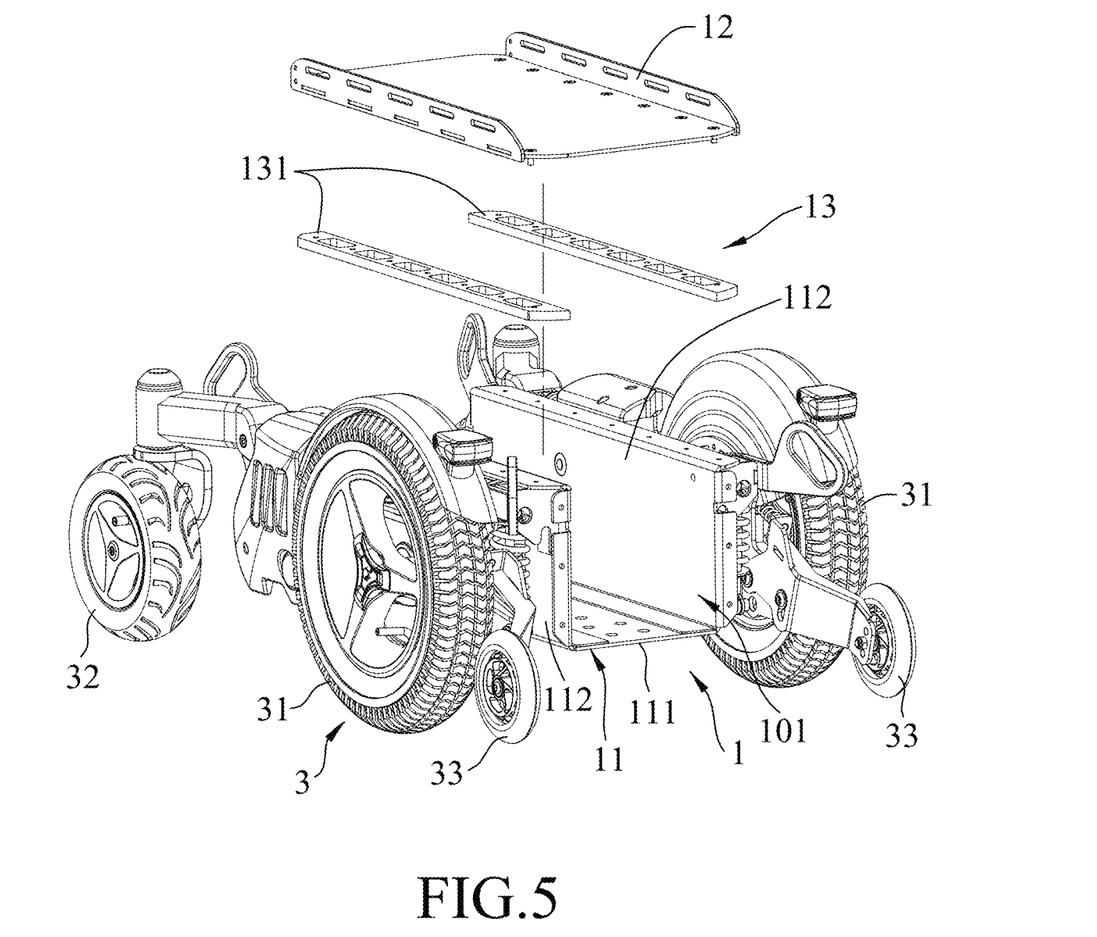
FIG. 5 is an exploded perspective view of the embodiment with a modular raising strip assembly in a modified form.

In this embodiment, the modular raising strip assembly 13 is formed as a U-shaped piece to enhance the aesthetic appeal of the chassis structure. With reference to FIG. 5, alternatively, the modular raising strip assembly 13 may have two elongated strips 131, each of which is sandwiched between the upper edge of the respective side wall 112 and the upper cover 12. As compared with the U-shaped piece, the two separate elongated strips 131 have a smaller volume for facilitating storage thereof.

Figure 6:
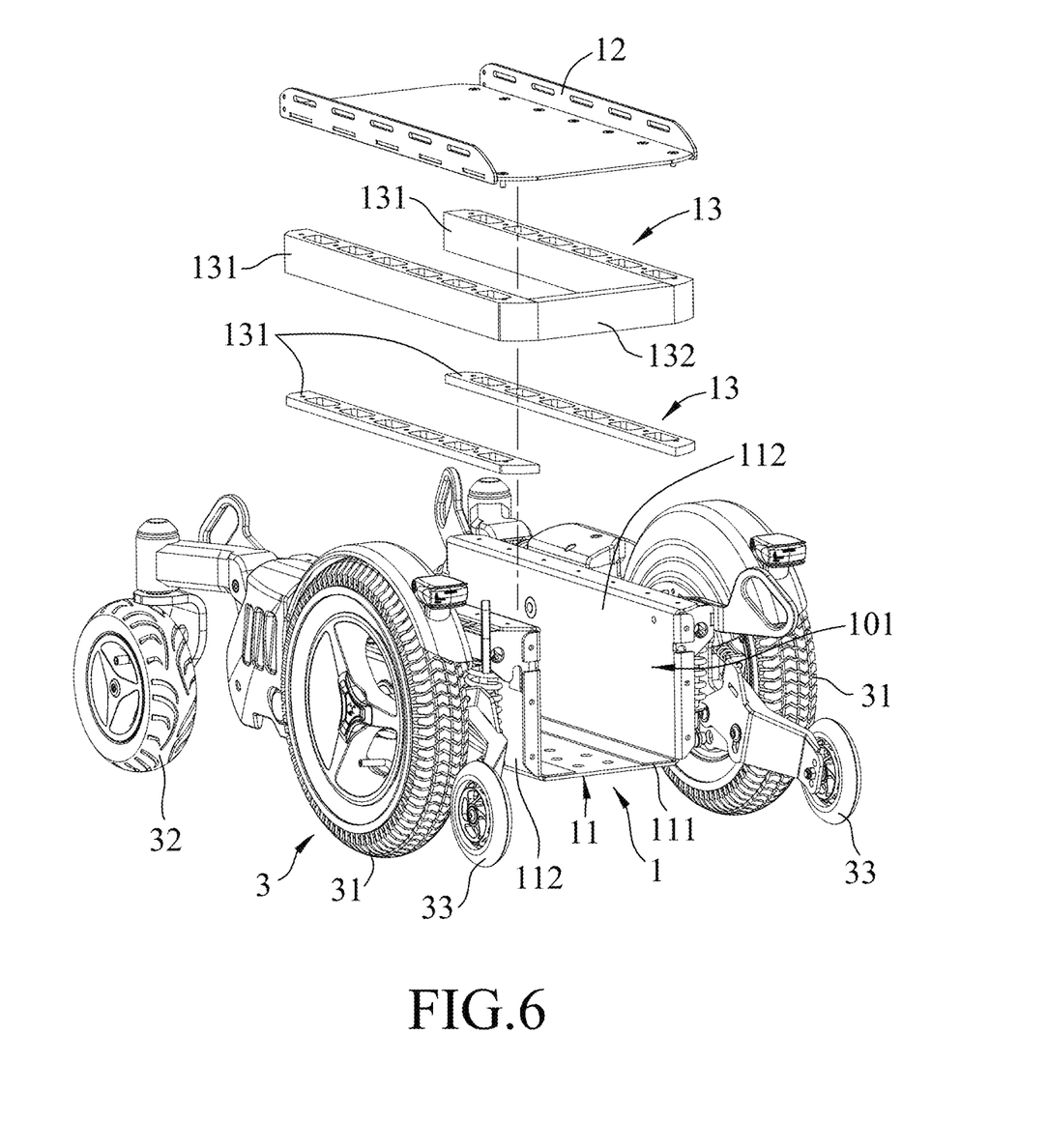
FIG. 6 is an exploded perspective view of the embodiment with a plurality of modular raising strip assemblies.

In various embodiments, with reference to FIG. 6, a plurality of modular raising strip assemblies 13 may be provided, and are superimposed upon each other to further increase the volume of the accommodation space 101 of the housing unit 1. The modular raising strip assemblies 13 may be in the form of the U-shaped piece or the two separate elongated strips 131.

Figure 7:
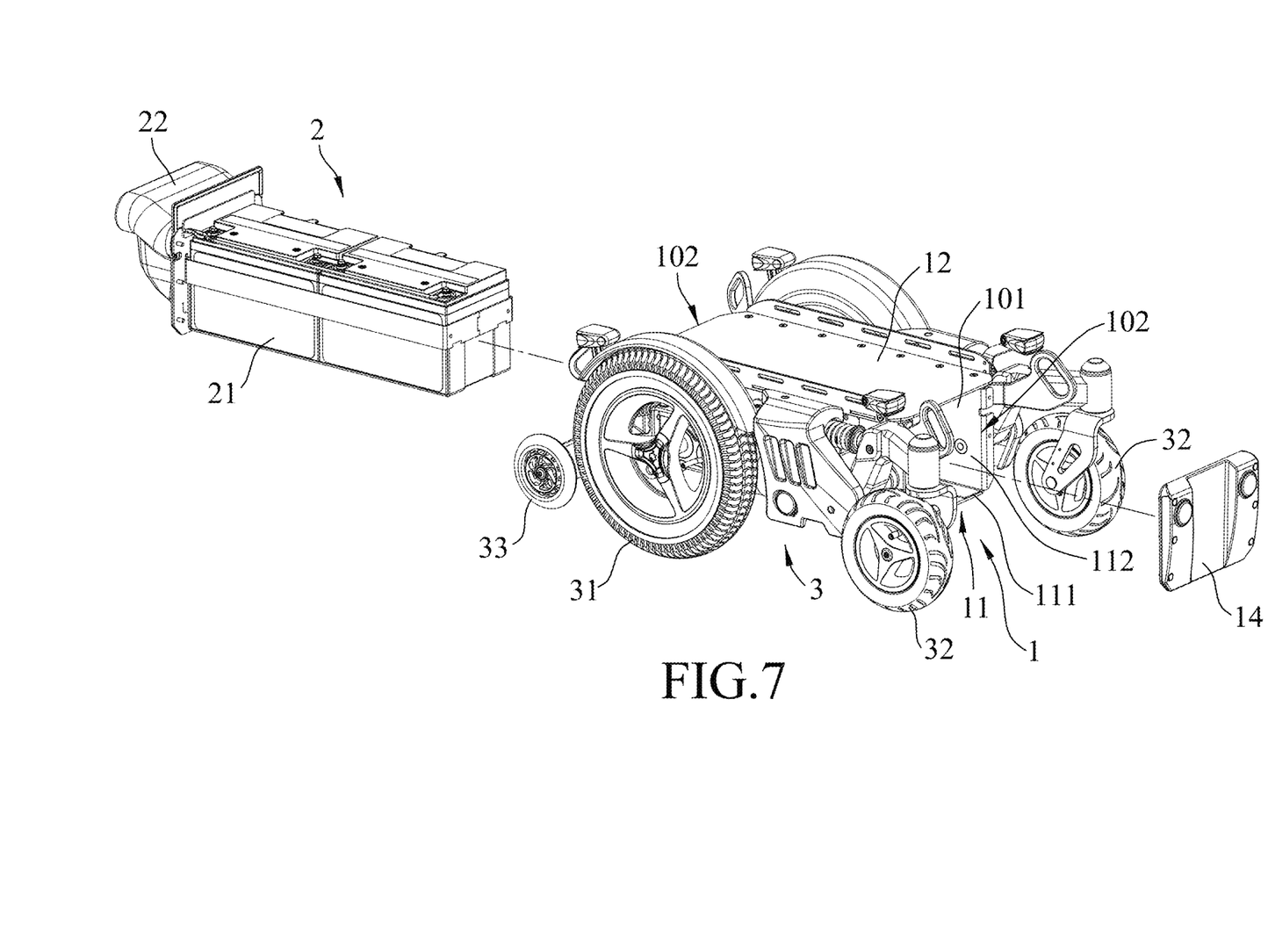
FIG. 7 is an exploded perspective view of the embodiment, illustrating when the drive unit is mounted through the other mounting access opening.

In various embodiments, with reference to FIG. 7, the drive unit 2 may be mounted in the accommodation space 101 through the mounting access opening 102 near the front wheels 31. In this case, the drive unit 2 may be rear-wheel drive which drives rotation of the rear wheels 32. The cover plate 14 is disposed to cover the mounting access opening 102 near the rear wheels 32. Hence, the drive unit 2 can be mounted within the housing unit 1 through either one of the mounting access openings 102 to render the assembling work more flexible.

As illustrated, with the modular raising strip assembly (assemblies) 13 replaceably disposed between the chassis housing 11 and the upper cover 12 to increase the volume of the accommodation space 101, the volume of the accommodation space 101 is adjustable according to the battery capacity of the battery pack 21 of the drive unit 2 to meet the user's requirements in terms of operating environment and range. Also, with the modular raising strip assemblies 13 having its predetermined thickness, it is not required to make chassis housings with different dimensions to accommodate the drive units 2 with different dimensions of battery packs 21. The chassis structure is thus easier to manufacture and may be manufactured at a relatively low cost, and provides the user with the benefits of high flexibility and good utility.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A chassis structure for an electric power wheelchair adapted for a seat frame to be mounted and supported thereon, comprising:
   a housing unit including a chassis housing which defines therein an accommodation space that has an upper opened end, and an upper cover which is coupled with said chassis housing to cover said upper opened end;
   a drive unit disposed in said accommodation space;
   a wheel unit rotatably disposed on said housing unit and driven by said drive unit; and
   at least one modular raising strip assembly which is removably sandwiched between said chassis housing and said upper cover and which has a predetermined thickness such that volume of said accommodation space is increased with said raising strip assembly by an amount that is predetermined and that corresponds to the predetermined thickness of said modular raising strip assembly.

2. The chassis structure as claimed in claim 1, wherein said chassis housing is of a box shape, and has a base and two side walls extending upwardly from said base, said modular raising strip assembly having two elongated strips, each of which is sandwiched between an upper edge of a respective one of said side walls and said upper cover.

3. The chassis structure as claimed in claim 2, wherein said modular raising strip assembly further has a crosspiece which is integrally formed with and interconnects said two elongated strips to be formed as a U-shaped piece.

4. The chassis structure as claimed in claim 2, wherein said chassis structure comprises a plurality of said modular raising strip assemblies.

5. The chassis structure as claimed in claim 2, wherein said base, said side walls, said modular raising strip assembly and said upper cover cooperatively define two mounting access openings in communication with said accommodation space.

6. The chassis structure as claimed in claim 5, wherein said drive unit is mounted in said accommodation space of said housing unit through one of said mounting access openings.

7. The chassis structure as claimed in claim 2, wherein said upper cover has an upper support side for the seat frame to be mounted and supported thereon.

8. The chassis structure as claimed in claim 6, wherein said wheel unit includes two front wheels and two rear wheels rotatably connected to said chassis housing, said drive unit being disposed and configured to be front-wheel drive or rear-wheel drive which drives rotation of corresponding ones of said front wheels and said rear wheels.

* * * * *